Patented Jan. 20, 1953

2,626,236

UNITED STATES PATENT OFFICE 2,626,236

PURIFICATION OF NAPHTHALENE

Benjamin F. Tatterson, Pittsburgh, Pa., assignor to Koppers Company, Inc., a corporation of Delaware No Drawing. Application February 8, 1949, Serial No. 75,297

6 Claims. (Cl. 202—57)

This invention is related to a method for the purification of naphthalene by treatment with sodium. More specifically, it is related to a method for the separation of naphthalene from excess sodium and from the reaction products of sodium with the naphthalene impurities.

It has been long known that naphthalene stubbornly retains small amounts of impurities, especially methylated coumarone and sulfur compounds, which substances cause a red coloration when commercial naphthalene is treated with hot concentrated sulfuric acid. In order to remove these impurities it has been proposed (Schroeter U. S. Patents 1,680,070, 1,763,410, and 1,800,159) that commercial or technical naphthalene be treated in a molten state with small percentages of metallic sodium or potassium or other easily melted metals of like properties. The recommended procedures for separation of the naphthalene from the residue of the purifying agents or from the compounds produced by the union of the impurities with the purifying agents consist of hot pressure filtration in hydrogen, or distillation at a relatively low temperature, distillation in a vacuum being a preferred mode of operation.

These methods of separation have great disadvantages. The filtration procedure is troublesome because of the tarry, sticky nature of the solids to be removed and because of the mechanical losses involved. Distillation results in the formation of considerable amounts of pyrophoric solids which collect in the distilling apparatus, thereby coating the heating surfaces and causing poor heat transfer. Eventually these deposits become coked and usually can be removed only by chipping or chiseling from equipment surfaces. These accumulations of solid obviously interfere with the efficiency of the distillation and subsequently necessitate prolonged interruptions for removal of the solids from the equipment. Moreover, these pyrophoric deposits are hazardous since exposure to air, which is difficult to avoid in manually cleaning the equipment, frequently causes the masses to burst into flame.

It has now been found that these disadvantages are overcome by a water-treatment of the residue of the sodium and the products produced by the reaction of the impurities with the sodium, this water-treatment being effected either before or after distillation of the naphthalene.

The choice of whether the water-treatment is to be effected before or after distillation of the naphthalene is governed by the amount of sulfur which may be tolerated in the naphthalene product. If it is not necessary that the sulfur impurities be substantially completely removed from the naphthalene, the water-wash may precede the naphthalene distillation. In this event, the subsequent naphthalene distillation gives, instead of a solid coke residue, an easily removable tar residue. Where a pure grade of naphthalene is desirable, e. g. one suitable for hydrogenation purposes, containing substantially no sulfur impurities that will poison a hydrogenation catalyst, it is advantageous that the naphthalene is distilled from the impurities and that the solid coke residue is subsequently converted to a more easily removed fluid form by the water-treatment described hereinafter.

These alternative treatments for the practice of this invention may be best illustrated by the following example. A sample of crude naphthalene containing 0.55 percent sulfur was divided into two equivalent portions and each portion was treated with a sodium-naphthalene emulsion containing one part by weight of sodium per part by weight of naphthalene. The weight of sodium in the amount of emulsion used in each case was equivalent to 2.4 percent based on the weight of naphthalene treated. The resultant naphthalene-sodium mixtures were heated to the boiling point at atmospheric pressure with stirring for about one hour or more. After this treatment one of the products was given treatment I and the other was given treatment II. In treatment I the naphthalene was separated from the impurities directly by distillation at an absolute pressure of 100 mm. of mercury. In treatment II the sodium-treated naphthalene was blanketed with steam to exclude air, then water-washed, and the resultant naphthalene layer separated and subsequently distilled under an absolute pressure of 100 mm. of mercury. The data and properties of the products are given in the following table, percentages being given as percentages by weight.

|  | I | II |
|---|---|---|
| Crude naphthalene: | | |
| Sulfur_____percent__ | 0.55 | 0.55 |
| F. P., T, ° C_____ | 75.4 | 75.4 |
| Distilled naphthalene: | | |
| F. P., 79.6° C_____percent__ | 89.4 | 42.3 |
| F. P., 78.0° C_____do____ | 96 | 92 |
| Sulfur_____do____ | 0.005 | 0.23 |
| Residue_____do____ | [1] 6 | [2] 4 |

[1] Coke.
[2] Tar.

Although treatment II does not give as pure a naphthalene product, it avoids the necessity of interruption for cleaning the equipment. Therefore, for naphthalene purposes which do not require practically complete removal of sulfur impurities, this treatment has been found very advantageous. The solids which are formed by the action of sodium on crude naphthalene are thereby converted to oils and tars which are easily removable. This water-treatment changes the nature of the distillation residue from a solid coke to oils and tars which require no special techniques or inconvenience for removal. It avoids the danger, inconvenience and expense of removing the pyrophoric solids from the apparatus.

In effecting treatment I, care must be taken to prevent contact of the solid residue with air since the pyrophoric mass has a tendency to burst into flame. At the end of the distillation, the vacuum is relieved with steam, or with nitrogen, or other gas inert to the action of any liberated hydrogen. With the distillation kettle at about 200° C., or whatever the ultimate distillation temperature may be, wet steam is fed into the kettle and condensate is allowed to run from the condenser and distillation column back into the kettle until the solid residue is substantially covered with water. The entrance of the steam cools the kettle from the initial 200° C. to the boiling point of the water mixture, approximately 135° C. The water is then boiled for several hours, during which time a small amount of orange oil is taken from the condensation receivers with some water. Water and residue are then gradually drained from the equipment through a two-inch pipe while water is gradually fed into the kettle to replace the liquid being removed, and the water heating, feeding and draining are continued until there is no longer a flow of residue with the water.

In treatment II, it is likewise important that air be excluded during the addition of water to the sodium-treated naphthalene. The air may be swept from above the naphthalene by a stream of steam or nitrogen before the water is introduced. It has been found convenient to add the water simply by feeding in wet steam and allowing it to cool and condense in the naphthalene container. Care must be taken that the temperature maintained is above the freezing point of the naphthalene. When sufficient water has been added, stirred and allowed to react with the naphthalene mixture the water is allowed to settle and is subsequently drained off with the soluble and dispersed impurities. If desirable this washing step may be repeated. After the water layer has been removed the temperature is raised for distillation of the naphthalene. The residue from the distillation of the naphthalene. The residue from the distillation is found to be sufficiently fluid for easy removal from the distillation kettle.

The above descriptions are not intended to limit the invention but rather to serve as illustrations of the manner in which the invention may be practiced. Obviously many modifications may be made in the manner in which the invention is practiced. Moreover, the sodium treatment may be modified by the use of sodium metal alone, potassium-sodium alloy or posssibly hydrocarbon-sodium emulsions other than the above-mentioned sodium-naphthalene emulsion. In addition, the amount of sodium used may vary according to the degree of purification desired, according to the amount of sulfur present in the naphthalene and according to the type of crude naphthalene.

What is claimed is:

1. In a process for the purification of naphthalene by treatment with metallic sodium followed by distillation of naphthalene from the sodium reaction mass leaving a solid residue, the steps of treating in the still the residue from said distillation which comprise feeding steam into the space of the residue-containing still above said residue, condensing at least part of said steam and allowing the resultant condensation water to flow onto said residue, and refluxing said water until the residue has been converted to a flowable liquid.

2. The process of claim 1, in which the amount of condensation water allowed to flow onto said residue is sufficient to lower the temperature of the resultant mass to a degree at which water may be present in liquid state in the mass.

3. In a process for the purification of naphthalene by treatment with metallic sodium followed by distillation of naphthalene from the sodium reaction mass leaving a solid residue, the steps of blanketing the solid distillation residue with an inert atmosphere of the class consisting of steam and nitrogen, treating the distillation residue with water, and refluxing the water until the solid residue has been converted to a flowable liquid.

4. The process of claim 3, in which the inert atmosphere is steam.

5. The process of claim 3, in which the inert atmosphere is nitrogen.

6. The process of claim 3, in which the water is heated to the boiling temperature of the mixture.

BENJAMIN F. TATTERSON.

REFERENCES CITED

The following references are of record in the file of this patent:

UNITED STATES PATENTS

| Number | Name | Date |
|---|---|---|
| 1,680,070 | Schroeter | Aug. 7, 1928 |
| 1,763,410 | Schroeter | June 10, 1930 |
| 1,800,159 | Schroeter | Apr. 7, 1931 |